(12) United States Patent
Yokoyama

(10) Patent No.: US 9,005,764 B2
(45) Date of Patent: Apr. 14, 2015

(54) WINDOWPANE FOR COMBUSTION APPARATUSES

(71) Applicant: Nippon Electric Glass Co., Ltd., Otsu-shi, Shiga (JP)

(72) Inventor: Shohei Yokoyama, Kusatsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 14/240,852

(22) PCT Filed: Jan. 9, 2013

(86) PCT No.: PCT/JP2013/050144
§ 371 (c)(1),
(2) Date: Feb. 25, 2014

(87) PCT Pub. No.: WO2013/108673
PCT Pub. Date: Jul. 25, 2013

(65) Prior Publication Data
US 2014/0366862 A1    Dec. 18, 2014

(30) Foreign Application Priority Data
Jan. 19, 2012   (JP) ................. 2012-008549

(51) Int. Cl.
*B32B 17/06*   (2006.01)
*B32B 15/04*   (2006.01)
(Continued)

(52) U.S. Cl.
CPC .............. *F23M 11/042* (2013.01); *C03C 17/04* (2013.01); *F23M 11/04* (2013.01); *F24C 15/04* (2013.01); *F24B 1/192* (2013.01); *C03C 14/004* (2013.01); *C03C 2214/04* (2013.01)

(58) Field of Classification Search
USPC ......... 428/426, 428, 432, 688, 689, 697, 699, 428/701, 702, 220
See application file for complete search history.

(56) References Cited

U.S. PATENT DOCUMENTS

2008/0254268 A1   10/2008  Okahata et al.
2010/0273631 A1*  10/2010  Pelletier et al. ................. 501/26

FOREIGN PATENT DOCUMENTS

EP       1 085 555 A1    3/2001
JP       2001-135250 A   5/2001
(Continued)

OTHER PUBLICATIONS

Contardi (http://www.contardi.it/industria_prodotti.php?In=en&id=4), 2014.*
(Continued)

*Primary Examiner* — David Sample
*Assistant Examiner* — Lauren Colgan
(74) *Attorney, Agent, or Firm* — Keating & Bennett, LLP

(57) ABSTRACT

Provided is a windowpane for a combustion apparatus in which a light-blocking layer containing an inorganic pigment powder and a glass powder is formed on a surface of a transparent crystallized glass plate and the light-blocking layer can sufficiently hide an adhesive, a gasket or the like used to fix the windowpane to the body of the combustion apparatus and which can reduce the occurrence of cracks due to heat in the light-blocking layer. A windowpane for a combustion apparatus in which a light-blocking layer containing an inorganic pigment powder and a glass powder is formed on a surface of a transparent crystallized glass plate, wherein the light-blocking layer contains 30 to 50% by mass of the inorganic pigment powder and 50 to 70% by mass of the glass powder and has a thickness of 1 to 10 μm and the inorganic pigment powder has an average particle size of 0.8 μm or less.

5 Claims, 1 Drawing Sheet

(51) Int. Cl.
*F23M 11/04* (2006.01)
*C03C 17/04* (2006.01)
*F24C 15/04* (2006.01)
*F24B 1/192* (2006.01)
*C03C 14/00* (2006.01)

(56) References Cited

FOREIGN PATENT DOCUMENTS

| JP | 2007-39294 A | 2/2007 |
|---|---|---|
| JP | 2008-276215 A | 11/2008 |
| JP | 2010-96390 A | 4/2010 |
| JP | 2010-272240 A | 12/2010 |

OTHER PUBLICATIONS

English translation of Official Communication issued in corresponding International Application PCT/JP2013/050144, mailed on Jul. 31, 2014.

Official Communication issued in International Patent Application No. PCT/JP2013/050144, mailed on Apr. 2, 2013.

* cited by examiner

WINDOWPANE FOR COMBUSTION APPARATUSES

TECHNICAL FIELD

This invention relates to windowpanes for use in combustion apparatuses using firewood, gas, coal, oil or the like as fuel.

BACKGROUND ART

Stoves and fireplaces for burning firewood, gas, coal, oil or the like are conventionally used as combustion apparatuses having a space heating effect. Such a combustion apparatus is equipped with a windowpane to allow visual check of the condition of flame from the outside. The windowpane needs to be transparent to visible light and have high thermal shock resistance. As materials having these properties, low-expansion transparent crystallized glasses are generally used.

The windowpane for combustion apparatuses is fixed to, for example, a metal frame of a combustion apparatus body through a gasket, an adhesive or the like. If the gasket or adhesive is visible from the outside, the design quality is impaired. Therefore, to hide a portion of the windowpane lying on the gasket or adhesive, a light-blocking layer is printed on at least part of the windowpane. For example, Patent Literatures 1 and 2 disclose methods for forming a layer containing an inorganic pigment powder and a glass powder on a surface of a transparent crystallized glass plate.

CITATION LIST

Patent Literature

Patent Literature 1: JP-A-2007-39294
Patent Literature 2: JP-A-2010-96390

SUMMARY OF INVENTION

Technical Problem

In Patent Literature 1, the method has an object of forming a relatively dense ornamental layer on the glass surface, which presents a problem in that cracks may be likely to occur in the ornamental layer with prolonged use of the combustion apparatus. In addition, the ornamental layer has less light-blocking property. Therefore, even if this method is applied to light blocking, the gasket or adhesive cannot sufficiently be hidden.

On the other hand, in the method proposed in Patent Literature 2, the light-blocking layer contains a relatively large amount of inorganic pigment and is therefore porous, resulting in less likelihood of developing cracks due to heat. However, the light-blocking layer has a problem of poor appearance because of insufficiency of the light-blocking property.

In view of the foregoing points, an object of the present invention is to provide a windowpane for a combustion apparatus in which a light-blocking layer containing an inorganic pigment powder and a glass powder is formed on a surface of a transparent crystallized glass plate and the light-blocking layer can sufficiently hide an adhesive, a gasket or the like used to fix the windowpane to the body of the combustion apparatus and which can reduce the occurrence of cracks due to heat in the light-blocking layer.

Solution to Problem

The present invention relates to a windowpane for a combustion apparatus in which a light-blocking layer containing an inorganic pigment powder and a glass powder is formed on a surface of a transparent crystallized glass plate, wherein the light-blocking layer contains 30 to 50% by mass of the inorganic pigment powder and 50 to 70% by mass of the glass powder and has a thickness of 1 to 10 µm and the inorganic pigment powder has an average particle size of 0.8 µm or less.

By the above specified composition ratio of inorganic pigment powder and glass powder in the light-blocking layer and the above specified thickness of the light-blocking layer in the windowpane for a combustion apparatus according to the present invention, the occurrence of cracks due to heat can be reduced. Furthermore, the occurrence of spots due to water containing soot or the like, adhesive or the like can be concurrently reduced. With the inorganic pigment powder having an average particle size as fine as 0.8 µm or less, the filling rate of the inorganic pigment powder in the light-blocking layer becomes high, which can improve the light-blocking property.

Secondly, in the windowpane for a combustion apparatus according to the present invention, the light-blocking layer is preferably formed on at least part of a peripheral portion of the transparent crystallized glass plate.

Generally, a windowpane for combustion apparatus is fixed at its peripheral portion to a metal frame or the like of the combustion apparatus body through a gasket, an adhesive or the like. Therefore, by forming a light-blocking layer on at least part of the peripheral portion of the transparent crystallized glass plate forming the windowpane, the gasket, adhesive or the like can be effectively hidden.

Thirdly, in the windowpane for a combustion apparatus according to the present invention, the inorganic pigment powder is preferably a powder of Cr—Fe—Co—Ni-based pigment.

The Cr—Fe—Co—Ni-based black pigment is characterized in that it hardly degrade and discolor even when subjected to a thermal treatment at high temperatures during the process of producing the windowpane for a combustion apparatus.

Fourthly, in the windowpane for a combustion apparatus according to the present invention, the transparent crystallized glass plate preferably has an average coefficient of linear thermal expansion of $-10\times10^{-7}$ to $+30\times10^{-7}/°C$. at 30 to 750° C.

With the above configuration, a windowpane having excellent thermal shock resistance can be obtained. Furthermore, even when the windowpane repeatedly undergoes heating and cooling, the light-blocking layer is less likely to develop cracks and the occurrence of spots due to water or adhesive can be reduced.

Fifthly, the present invention relates to a combustion apparatus including any one of the above windowpanes for a combustion apparatus.

Advantageous Effects of Invention

With the use of the windowpane for a combustion apparatus according to the present invention, the light-blocking layer can sufficiently hide an adhesive, a gasket or the like used to fix the windowpane to the body of the combustion apparatus and the occurrence of cracks due to heat and spots due to water or adhesive in the light-blocking layer can be reduced.

DESCRIPTION OF EMBODIMENTS

Hereinafter, a description will be given of an embodiment of a windowpane for a combustion apparatus according to the present invention with reference to the drawings.

Figure 1:
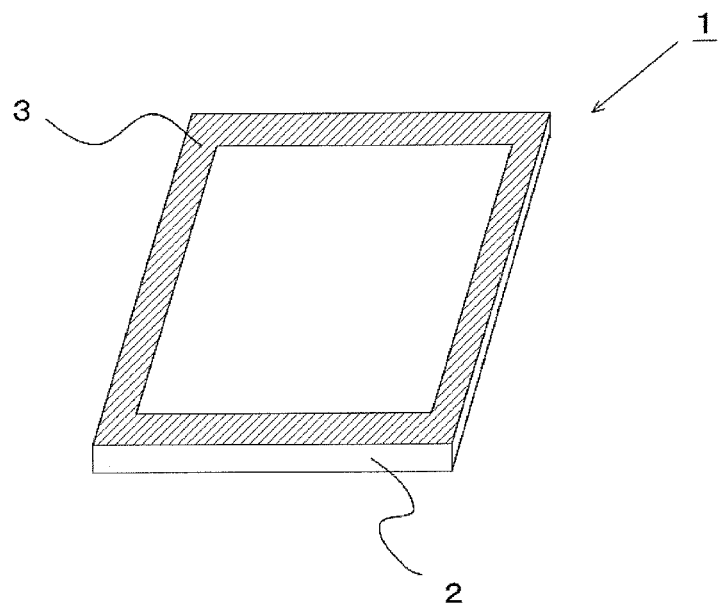
FIG. 1 is a schematic perspective view showing an embodiment of a windowpane for a combustion apparatus according to the present invention.
Figure 2:
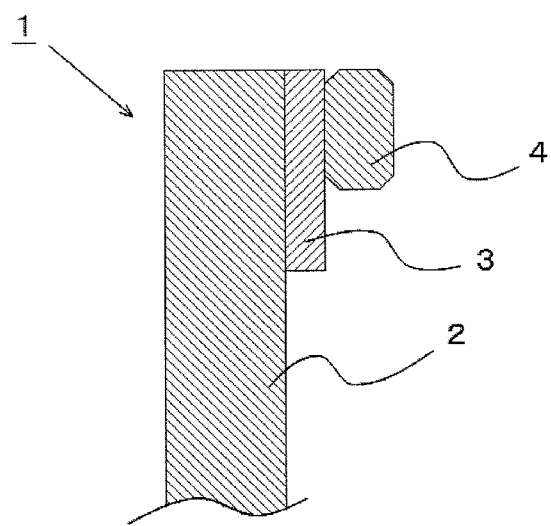
FIG. 2 is a schematic cross-sectional view showing the embodiment of the windowpane for a combustion apparatus according to the present invention.

FIGS. 1 and 2 are schematic perspective and cross-sectional views showing an embodiment of a windowpane for a combustion apparatus according to the present invention.

A windowpane 1 for a combustion apparatus of the present invention includes a transparent crystallized glass plate 2 and a light-blocking layer 3 formed on a surface of the transparent crystallized glass plate 2. The light-blocking layer 3 is formed, for example, on a peripheral portion of the transparent crystallized glass plate 2. Thus, as shown in FIG. 2, for example, a gasket 4 for use in fixing the windowpane 1 for a combustion apparatus to a frame of the combustion apparatus body can be hidden invisibly from the outside. Furthermore, also with the use of an adhesive for the purpose of fixation of the windowpane 1 for a combustion apparatus, the adhesive can be hidden by the light-blocking layer 3.

An example of the transparent crystallized glass plate 2 is a crystallized glass in which a β-quartz solid solution crystal is precipitated as a main crystal. This crystallized glass is preferred in that it has a small coefficient of thermal expansion and therefore excellent thermal shock resistance.

The transparent crystallized glass plate 2 preferably has a coefficient of thermal expansion of $-10 \times 10^{-7}$ to $+30 \times 10^{-7}/°$ C. and particularly preferably $-10 \times 10^{-7}$ to $+20 \times 10^{-7}/°$ C. within the temperature range of 30 to 750° C. With the coefficient of thermal expansion in this range, this reduces the occurrence of cracks in the light-blocking layer 3 when the glass plate repeatedly undergoes heating and cooling.

Examples of the crystallized glass having the aforementioned coefficient of thermal expansion include crystallized glasses which contain, in % by mass, 50 to 75% $SiO_2$, 10 to 30% $Al_2O_3$, 0 to 8% MgO, 0 to 8% BaO, 0 to 10% ZnO, 1 to 7% $Li_2O$, 0 to 7% $Na_2O$, 0 to 7% $K_2O$, 1 to 5% $TiO_2$, 1 to 10% $TiO_2+ZrO_2$, 0 to 10% $P_2O_5$, and 0.1 to 3% clarifying agent and in which a β-quartz solid solution crystal is internally precipitated.

Among these crystallized glasses, the crystallized glasses which contain, in % by mass, 55 to 70% $SiO_2$, 15 to 25% $Al_2O_3$, 0 to 5% MgO, 0 to 5% BaO, 0 to 5% ZnO, 3 to 5% $Li_2O$, 0 to 2% $Na_2O$, 0 to 2% $K_2O$, 1.3 to 3% $TiO_2$, 2 to 6% $TiO_2+ZrO_2$, 0 to 5% $P_2O_5$, and 0.1 to 2% clarifying agent are preferable.

The preferred clarifying agent to be used is at least one selected from the group consisting of $As_2O_3$, $Sb_2O_3$, $SnO_2$, and Cl.

Alternatively, other examples of the transparent crystallized glass plate 2 that can be used include colored crystallized glasses which have a composition of, in % by mass, 60 to 70% $SiO_2$, 14 to 28% $Al_2O_3$, 0.1 to 2% MgO, 0 to 2% CaO, 0 to 3% BaO, 0.1 to 3% ZnO, 2.5 to 5.5% $Li_2O$, 0.1 to 2% $Na_2O$, 0 to 1% $K_2O$, 0 to 6% $TiO_2$, 0 to 3% $ZrO_2$, and 0.03 to 0.5% $V_2O_5$, are formed by precipitating a β-quartz solid solution crystal, and have a black appearance.

The light-blocking layer 3 contains an inorganic pigment powder and a glass powder. The contents of the powders in the light-blocking layer 3 are 30 to 50% by mass of the inorganic pigment powder and 50 to 70% by mass of the glass powder and preferably 40 to 50% by mass of the inorganic pigment powder and 50 to 60% by mass of the glass powder. If the content of the inorganic pigment powder is too small (or the content of the glass powder is too large), cracks will be likely to occur after the crystallized glass plate is subjected to a thermal treatment in forming a light-blocking layer 3 or when it repeatedly undergoes heating and cooling with the use as a windowpane for a combustion apparatus. Furthermore, a sufficient light-blocking property will be less likely to be obtained. On the other hand, if the content of the inorganic pigment powder is too large (or the content of the glass powder is too small), the light-blocking layer 3 will be porous, so that the crystallized glass plate will be likely to develop spots when water, adhesive or the like adheres thereto.

The average particle size ($D_{50}$) of the inorganic pigment powder is 0.8 μm or less and preferably 0.5 μm or less. Thus, the filling rate of the inorganic pigment powder in the light-blocking layer 3 becomes high, which can improve the light-blocking property. Particularly, the lower limit of the average particle size of the inorganic pigment powder is not limited.

However, if the lower limit is too low, this is likely to cause inconveniences, such as difficulty of handling, rise in production cost, and ease of agglomeration. Therefore, the average particle size of the inorganic pigment powder is preferably not less than 0.1 μm and particularly preferably not less than 0.2 μm.

Specific examples of the inorganic pigment powder include oxide black pigments, such as Cr—Fe—Co—Ni-based oxides, Cu—Cr-based oxides, Cu—Cr—Fe-based oxides, and Cu—Cr—Mn-based oxides; oxide white pigments, such as $TiO_2$, $ZrO_2$, and $ZrSiO_4$; oxide blue pigments, such as Co—Al—Zn-based oxides, Co—Al—Si-based oxides, and Co—Al—Ti-based oxides; oxide green pigments, such as Co—Al—Cr-based oxides and Co—Ni—Ti—Zn-based oxides; oxide yellow pigments, such as Ti—Sb—Cr-based oxides and Ti—Ni-based oxides; oxide red pigments, such as Co—Si-based oxides; and oxide brawn pigments, such as Ti—Fe—Zn-based oxides, Fe—Zn-based oxides, Fe—Ni—Cr-based oxides, and Zn—Fe—Cr—Al-based oxides. Particularly, the Cr—Fe—Co—Ni-based black pigments are characterized in that they hardly degrade and discolor even when subjected to a thermal treatment at high temperatures during the process of producing the windowpane for a combustion apparatus.

Examples of glass that can be used as the glass powder include $B_2O_3$—$SiO_2$-based glasses, $Na_2O$—CaO—$SiO_2$-based glasses, $Li_2O$—$Al_2O_3$—$SiO_2$-based glasses, and ZnO—$Al_2O_3$—$P_2O_5$-based glasses.

The thickness of the light-blocking layer 3 is 1 to 10 μm and preferably 2 to 5 μm. If the thickness of the light-blocking layer 3 is too small, the light-blocking property tends to be insufficient. On the other hand, if the thickness of the light-blocking layer 3 is too large, cracks will be likely to occur during the production process or during use in a combustion apparatus. Furthermore, the occurrence of cracks facilitates the occurrence of spots.

Although in this embodiment the light-blocking layer 3 is formed on at least part of the peripheral portion or the like of the transparent crystallized glass plate 2, the light-blocking layer 3 may be formed on the entire surface of the transparent crystallized glass plate 2. In this case, the light-blocking layer 3 may be formed to be thick at a portion for hiding the gasket, adhesive or the like and thin at the other portions to allow adequate visual check of flame inside.

Although in this embodiment a description has been given of the case where the windowpane 1 for a combustion apparatus is planar, the windowpane 1 may have a non-planar shape, such as a curved shape or bent shape, in consideration of design, practicability or other factors.

Next, a description will be given of a method for producing the windowpane 1 for a combustion apparatus.

First, a transparent crystallized glass plate 2 formed and processed in a predetermined size and shape is prepared. Meanwhile, an inorganic pigment powder and a glass powder are mixed and an organic solvent or the like is added to the mixture to form a paste. The obtained paste is printed on a surface of the crystallized glass plate, for example, by screen printing, transfer printing or other methods, dried, and then fired to form a light-blocking layer 3, thereby providing a windowpane 1 for a combustion apparatus. Particularly, screen printing is preferred because a light-blocking layer 3 having a uniform thickness can be easily and efficiently formed.

The firing is performed, for example, in an electric furnace. The firing conditions may be appropriately controlled so that the inorganic pigment powder and the glass powder can be sufficiently sintered. For example, the firing temperature is preferably 200 to 1000° C. and particularly preferably 250 to 900° C. The firing time is preferably ten minutes to one hour and particularly preferably thirty minutes to one hour.

In producing a non-planar windowpane 1 for a combustion apparatus, the above production method may be difficult to apply. The reason for this is that, unlike the case where the transparent crystallized glass plate 2 is planar, it is difficult to form a light-blocking layer 3 on the non-planar transparent crystallized glass plate 2. Particularly in the case of screen printing, it may be impossible to form the light-blocking layer because of facility constraints. It is conceivable as a method to form a light-blocking layer 3 on a planar transparent crystallized glass plate 2 and then soften and deform it into a non-planar shape. However, the crystallized glass is difficult to soften and deform by heat application and, therefore, it is practically difficult to apply this method.

To cope with this, the following method is preferably applied to producing a non-planar windowpane 1 for a combustion apparatus.

First, a yet-to-be-crystallized planar glass precursor formed and processed in a predetermined size and shape is prepared and a paste for forming a light-blocking layer 3 is printed on the planar glass precursor. Next, the planar glass precursor having the paste formed thereon is formed (for example, bent) into a predetermined non-planar shape by hot press. Thereafter, the glass precursor is subjected to a thermal treatment, whereby the glass precursor is crystallized and concurrently the paste is sintered to form the light-blocking layer 3. In this manner, a non-planar windowpane 1 for a combustion apparatus can be obtained.

In this case, because the crystallization temperature of the glass precursor is a high temperature (for example, 850° C. or above), the inorganic pigment powder is required to neither degrade nor discolor at the temperature. As described previously, Cr—Fe—Co—Ni-based pigments are hardly degraded and discolored by a thermal treatment, for example, at 850° C. or above and therefore can be formed into a light-blocking layer 3 having desired properties. Furthermore, also in the case of producing a planar windowpane 1 for a combustion apparatus, the use of a Ce—Fe—Co—Ni-based pigment can allow the crystallization of glass precursor and the formation of a light-blocking layer 3 simultaneously, resulting in improved productivity.

EXAMPLES

Hereinafter, the windowpane for a combustion apparatus according to the present invention will be described in detail with reference to examples. However, the present invention is not limited to the following examples.

First, a Cr—Fe—Co—Ni-based black inorganic pigment powder and a $B_2O_2$—$SiO_2$-based glass powder ($SiO_2$ content: 63% by mass, $B_2O_3$ content: 19% by mass), both commercially available, were mixed to reach the individual mass ratio shown in Table 1 and a resin and an organic solvent are added to the mixture to produce a paste.

Next, the paste was screen printed on a transparent crystallized glass plate (N-0 manufactured by Nippon Electric Glass Co., Ltd. and having an average coefficient of linear thermal expansion of $-4 \times 10^{-7}$/° C. at 30 to 750° C.). Subsequently, the paste was dried at 10 to 150° C. for 10 to 20 minutes and then fired at 900° C. for 60 minutes to form a light-blocking layer, resulting in a windowpane for a combustion apparatus.

The resultant windowpane for a combustion apparatus was evaluated in terms of crack, spot, light-blocking property, and color in the following manners. The results are shown in Table 1.

In the evaluation of crack, it was visually checked whether or not cracks occurred at the interface of the light-blocking layer with the transparent crystallized glass plate. Examples found to have developed cracks were represented by "○", while examples found to have developed no crack were represented by "x".

In the evaluation of spot, water containing 5% by mass of soot added thereto was applied to the surface of the light-blocking layer with a brush and the transparent crystallized glass plate was visually observed from the opposite side to the light-blocking layer. Examples found to have developed no spot were represented by "○", while examples clearly found to have developed spots were represented by "x".

In the evaluation of light-blocking property, fluorescent light 100 cm away from the light-blocking layer was seen from the opposite side of the transparent crystallized glass plate to the light-blocking layer. Examples not found to have transmitted the light were represented by "○", while examples found to have transmitted the light were represented by "x".

The color was evaluated by observation with the naked eye, wherein examples having exhibited an original color (black) of the inorganic pigment powder used were represented by "○", while an example having discolored and lightened was represented by "x".

TABLE 1

|  | Ex. 1 | Ex. 2 | Ex. 3 | Ex. 4 | Ex. 5 |
|---|---|---|---|---|---|
| Inorganic Pigment Powder (% by mass) | 45 | 45 | 30 | 45 | 45 |
| Glass Powder (% by mass) | 55 | 55 | 70 | 55 | 55 |
| Average Particle Size of Inorganic Pigment Powder (μm) | 0.5 | 0.8 | 0.5 | 0.5 | 0.5 |
| Type of Inorganic Pigment Powder |  | | Cr—Fe—Co—Ni | | |
| Thickness of Light-Blocking Layer (μm) | 5 | 5 | 5 | 1 | 10 |
| Evaluation of Crack | ○ | ○ | ○ | ○ | ○ |
| Evaluation of Spot | ○ | ○ | ○ | ○ | ○ |
| Evaluation of Light-Blocking Property | ○ | ○ | ○ | ○ | ○ |
| Evaluation of Color | ○ | ○ | ○ | ○ | ○ |

TABLE 2

|  | Comp. Ex. 1 | Comp. Ex. 2 | Comp. Ex. 3 | Comp. Ex. 4 |
|---|---|---|---|---|
| Inorganic Pigment Powder (% by mass) | 45 | 45 | 55 | 45 |
| Glass Powder (% by mass) | 55 | 55 | 45 | 55 |
| Average Particle Size of Inorganic Pigment Powder (μm) | 1.0 | 1.0 | 0.5 | 0.5 |
| Type of Inorganic Pigment Powder | Cu—Cr—Mn | | Cr—Fe—Co—Ni | |
| Thickness of Light-Blocking Layer (μm) | 5 | 5 | 5 | 12 |
| Evaluation of Crack | ○ | ○ | ○ | x |
| Evaluation of Spot | ○ | ○ | x | x |
| Evaluation of Light-Blocking Property | x | x | ○ | ○ |
| Evaluation of Color | x | ○ | ○ | ○ |

As seen from Table 1, the windowpanes for a combustion apparatus of Examples 1 to 5 were found to have developed no spot due to soot, have had sufficient light-blocking property, and have exhibited original black colors of the inorganic pigment powders, which shows that they have excellent appearances.

On the other hand, the windowpanes for a combustion apparatus of Comparative Examples 1 and 2 were poor in light-blocking property. Particularly, in the windowpane for a combustion apparatus of Comparative Example 1, the inorganic pigment discolored and a desired color tone could not be achieved. The windowpanes for a combustion apparatus of Comparative Examples 3 and 4 were found to have developed spots. For Comparative Example 4, it can be considered that since cracks occurred in the light-blocking layer, water entered the cracks and thus caused spots.

REFERENCE SIGNS LIST 1 windowpane for combustion apparatuses
2 transparent crystallized glass plate
3 light-blocking layer
4 gasket

The invention claimed is:

1. A windowpane for a combustion apparatus in which a light-blocking layer containing an inorganic pigment powder and a glass powder is formed on a surface of a transparent crystallized glass plate,
    wherein the light-blocking layer contains 30 to 50% by mass of the inorganic pigment powder and 50 to 70% by mass of the glass powder and has a thickness of 1 to 10 μm and the inorganic pigment powder has an average particle size of 0.8 μm or less.

2. The windowpane for a combustion apparatus according to claim 1, wherein the light-blocking layer is formed on at least part of a peripheral portion of the transparent crystallized glass plate.

3. The windowpane for a combustion apparatus according to claim 1, wherein the inorganic pigment powder is a powder of Cr—Fe—Co—Ni-based pigment.

4. The windowpane for a combustion apparatus according to claim 1, wherein the transparent crystallized glass plate has an average coefficient of linear thermal expansion of $-10 \times 10^{-7}$ to $+30 \times 10^{-7}/°$ C. at 30 to 750° C.

5. A combustion apparatus including the windowpane for a combustion apparatus according to claim 1.

* * * * *